Jan. 12, 1965   L. B. SCOTT   3,165,373
TRAFFIC SPEED VIOLATION RECORDER
Filed Sept. 7, 1962   4 Sheets-Sheet 1

INVENTOR.
Loyce B. Scott,
BY
Atty.

Jan. 12, 1965 L. B. SCOTT 3,165,373
TRAFFIC SPEED VIOLATION RECORDER
Filed Sept. 7, 1962 4 Sheets-Sheet 2

INVENTOR.
Loyce B. Scott,
BY
/Atty.

Jan. 12, 1965   L. B. SCOTT   3,165,373
TRAFFIC SPEED VIOLATION RECORDER
Filed Sept. 7, 1962   4 Sheets-Sheet 3

INVENTOR.
Loyce B. Scott,
BY /Atty.

Jan. 12, 1965   L. B. SCOTT   3,165,373
TRAFFIC SPEED VIOLATION RECORDER
Filed Sept. 7, 1962   4 Sheets-Sheet 4

INVENTOR.
Loyce B. Scott,
BY
Atty.

3,165,373
TRAFFIC SPEED VIOLATION RECORDER
Loyce B. Scott, % Mid-Continent Insurance Company, 1307 B San Mateo NE., Albuquerque, N. Mex., assignor of one-half to Fred D. Huning, Jr., Albuquerque, N. Mex.
Filed Sept. 7, 1962, Ser. No. 221,974
18 Claims. (Cl. 346—107)

This invention relates to improvements in traffic speed violation recorders, and the like. Broadly stated, prime objectives of the invention include the provision of operative sequences and the means to produce such sequences, constituted to ensure; (1) complete unattended automatic operation of the equipment, (2) equipment of great simplicity, reliability, and economy of installation, operation, and maintenance, and (3) equipment and operations which will provide a permanent and irrefutable record of the identification and speed of the vehicle whose operations have been recorded by such equipment, which recording is of a nature and definiteness needed to comply with requirements imposed by law to enable the recordings to be used as legal evidence in support of the charge of speed violation by a specified vehicle. The presently to be disclosed equipment includes units which are so related to each other, and are so constituted as to comply with all three of the above stated objectives, as well as other objectives presently to appear hereinafter.

Stated otherwise, the invention may be included within a definition which includes the provision of means to test the time interval consumed by the vehicle in traversing an accurately measured path along the highway where the test is to be performed, together with means to make a photographic record of the rear portion of such vehicle, or other portion thereof if desired, when the time interval thus tested, for traversing such measured path is equal to or less than the time required to traverse such measured path at the lawful speed permitted at the location of such measured path. If such time interval is then equal to or less than that under which such measured path may be lawfully traversed, such photographic recording is produced automatically; if such time interval is more than that under which such measured path may be lawfully traversed, no recording is made, and the equipment is automatically reset to its normal or starting condition, preparatory to testing the time interval required for the next vehicle to traverse such measured path. Thus the photographic equipment which is included in the present combination of elements, is only actuated to produce photographic recordings under the condition that the vehicle which has instituted the speed test is travelling at a speed equal to or greater than that lawfully permitted at the location of the test. The hereinafter to be described equipment includes a single framing movie type camera in which the film is advanced one frame at a time; so the consumption of film under the previously stated operational conditions, is limited to the photographing of those vehicles which exceed the lawful speed at the test location. The photographing equipment is not actuated by the passage of vehicles travelling at less than such lawful speed at such location.

In connection with the foregoing, it is desirable to so set the present equipment adjacent to the roadway at the test location, that the rear portion of the vehicle is photographed, thus producing a recording of both the appearance of the rear portion of the vehicle, and the license plate carried by such vehicle. A typical showing of a vehicle traversing the measured path, and the photographic recording of the rear portion of such vehicle, are included in the drawings presently to be described.

Since the vehicle speeds which are to be recorded as law violations are in the higher speed ranges (being equal to or higher than the lawful speed at the test location), it follows that the signals to be produced at the arriving and departing instants at the beginning and ending of the test path, must be of a high speed signal producing and detecting nature in order that accurate and dependable recordings may be produced; and to ensure such accuracy of such recordings as will ensure that the evidence thus produced may conform to legal requirements in a law case involving vehicle speeds. Thus, for example, when the signals produced at the entering and leaving of the test measured path, are produced by conventional contacting tapes extended across the roadway at the entering and leaving ends of the test path, and when such tapes are six inches in width, a vehicle speed of 120 miles per hour will produce signals (due to compressions of such tapes by the vehicle wheels passing over them) of the order of 2.85 milliseconds (0.00285 sec.); and the time to traverse the space between two such tapes set 120 inches apart (ten feet), will be 0.05681 sec. Accordingly, the interval between the production of the two signals identifying the arrival of the vehicle at the commencement of the test zone and its departure from such test zone is very small. During such small interval the equipment of the present invention must be brought into operation, and the recording of the actual speed of the vehicle must be made, prior to departure of the vehicle from such test zone. The above illustrations of time intervals are, as stated, on the basis of a test distance of ten feet between the two signal producing tapes. Such ten foot value approximates the wheel bases of a large percentage of vehicles using the highways where such equipment as herein disclosed, would be used. Of course the available test interval corresponding to such ten foot separation between the two tapes will be different from that of the above example, on the basis of the inverse ratio of some other vehicle speed to the speed of 120 m.p.h. For the case of 150 m.p.h. the available test interval will be 0.04544+ sec. For the case of 60 m.p.h. the available test interval will be 0.11362 sec.

Longer or shorter test zones may be used, between the two tapes, with corresponding modification of the available test intervals, for various vehicle speeds. It is to be noted, however, that a test zone of length approximating that of the conventional wheel bases of vehicles using the highway, is desirable, to avoid improper interferences between signals produced by the vehicle under test, and a following vehicle close behind that vehicle under test. This will be referred to hereinafter.

The foregoing exploration shows that an accurate recording of the vehicle speed, under the stated conditions, requires that two basic conditions of speed be met and complied with. These are, first, that the relays or other detecting units which must respond to the signals produced by passage of the vehicle wheels over the tapes, must produce accurate and dependable signals under very short sustained impulses; and second, that the recording units controlled by such tape produced signals must act very fast and dependably, to meet the severe requirements imposed by the short time between arrivals of the successive tape produced signals. The presently to be described equipment meets both of these requirements to a high degree of certainty.

The starting and stopping of physically moving parts or elements necessarily involves the effects produced by mass and accelerations and decelerations of such elements. It is a prime object of the present invention to produce an ensemble of elements in which the effects of mass and inertia are used or are brought under control in such manner that objectionable "mass-inertia" effects are avoided, so that the tests of speed, even under the very short time intervals available to produce such recordings, are accurate and legally dependable. This result is secured, by way of example, and as shown in the embodiment presently to be described in detail, by use of a rotary body which is spring urged to rotate at increasing angular rate produced by the unwinding of the spring, and according to the effects defined by Hook's Law. Such rotary mass body is normally locked in the spring wound condition. The locking means acts at high speed to unlock the rotary mass when the signal is received from the first tape defining entry of the test zone. Then, at commencement of rotation of such mass, produced by the spring at the instant of unlocking the mass, the maximum spring effect is produced to produce acceleration of the mass. As the mass gains speed with corresponding unwind of the spring, the rate of rotary acceleration falls; but the counter conditions of reducing acceleration but increasing of speed and decreasing of torque produced by the spring, are such that less than a complete rotation of the mass occurs within a time interval large enough to accommodate the condition of smallest legal speed of the vehicle, and under the condition of separation between the two tapes defining the termini of the test zone.

It is evident that a speed-time curve may be produced representing the relation between any selected point on such rotary mass, compared to the location of such point prior to the unlocking operation. Conversely, it is also possible to produce on such rotary mass, markings defining speeds needed to attain successive positions of the mass, and corresponding to various speeds maintained during traverse of the test zone. Thus, the longer the time interval between the first and second signals (from the first and second tapes), the slower would be the travel of the vehicle through the test zone; and also the greater would be the angular displacement of the rotary mass from its original or starting position. Accordingly, it is possible to mark the rotary mass with indicia correspondng to the sustained speeds which are represented by successive angularly produced positions of the mass when the second signal is produced at the leaving end of the test zone.

It is to be noted that with the foregoing arrangement, wherein the rotated position of the rotary mass, measured from an initial position, as determined by the amount of such rotation permitted during the interval between the incoming of the first signal and that of the second signal (corresponding to a pre-determined advance of the vehicle through the test zone), necessarily results in production of markings on the rotary mass which are progressively more spaced from each other for equal changes of sustained speed; and that such progressive increase in the spaces between such markings is according to a geometric function, and not a uniform spacing. This is evident since for very high speeds the spacings necessarily approach zero for the condition (presumed) of zero advance during the travel of the vehicle through the test zone, an impossibility.

It is also noted that the mass of the rotary element thus accelerated by the unwinding spring, must be considered as the mass, not only of the marked body itself, but of all elements connected to such body and rotary therewith. Thus, the shaft on which such marked body is mounted, any movable contacts and mounting therefor, and other positively connected elements, must be included in the rotary mass thus considered.

Conveniently the main portion of such rotary mass is included in a distinct rotary element of considerable mass body which is calibrated by tests conducted with all of the other rotary elements connected thereto. Such other elements may in such case include one or several contact carrying disks, preferably of light material, but nevertheless constituting, when assembled with the main mass body, a portion of the rotary mass to be considered and tested. I shall hereinafter show the desirability of using such a rotary contact carrying disk as part of the assembly. It may also be desirable to provide two or more of the main mass elements, calibrated for different legally prescribed speed limits. Thus, for example, one speed limit for which provision may be made might be that allowed on wide open country highways; whereas another speed limit might be that prescribed for travel through congested areas, or through school zones or past hospitals, etc. To meet this condition I have made provision for removability of the main mass element, carrying the speed markings, and for substitution of another main mass element of different mass; each such element being calibrated when in physical operative engagement with all other mass elements, to show the various speeds corresponding to various rotated positions of the rotary unit, during the travel through the test zone, and producing the desired recording of speed through such test zone.

Various elements of circuitry are provided and will be hereinafter described, for properly receiving and activating elements according to received signals. It is, however, now noted that upon receiving the short signal from the first tape defining the entry to the test zone, the rotary mass element must be very promptly released to begin its accelerated rotary advance. Since the wound spring is constantly producing torque urging rotary advance of the rotary unit, such unit will commence its advance immediately upon release produced under control of such first tape signal. Conveniently the mass unit is normally restrained against the spring urge by a simple form of pawl or dog engaged with a protruding tooth of the rotary element, such pawl or dog restraining element normally being moved to tooth engaging position by a light spring provided for that purpose. As soon as the signal is received from the first tape such pawl or dog is withdrawn from its engagement with the tooth of the rotary body. When needed, a high speed relay is introduced into the circuitry between the tape and the solenoid which withdraws the pawl or dog, thus reducing the response time between production of the tape signal and release of the rotary mass, to one or less milliseconds. Accordingly, the time count (rotation of the rotary element) commences with a minimum of delay after passage of the vehicle wheel onto the first tape.

Having released the rotary mass its rotary speed will continue to accelerate according to a continuous reduction of acceleration due to unwinding of the spring; but, disregarding any frictional losses or change of such losses after calibration, the time to reach any pre-determined angular position of the rotary mass will remain unchanged until the conclusion of the single rotation (or slightly less) for which the unit is designed and installed. In this connection such frictional losses are reduced by use of anti-friction bearings for the rotary component and its elements. Accordingly it is possible to determine that rotary position which corresponds to the time interval of the vehicle to traverse the test zone at the highest lawful speed, (e.g., 70 m.p.h.). Provision is made for recording the speed, based on the time consumed to traverse the test zone, in any case where the time lapse between the incoming of the first signal and the second signal, from the tapes across the roadway, is less than that time lapse known to be required for such test zone traverse at speeds more than the lawful limit. Such provision for recording is as follows:

A camera unit is included in the present equipment, and the recorder is installed at a location proximate to the highway and the test zone, to enable focus of such camera onto vehicles traversing the test zone. Provision is made for producing on the record film of such camera a record of the speed of the vehicle, as shown by the rotated position of the rotary mass at the instant of the receipt of the second signal from the second tape defining the terminus of the test zone traverse. If the time to traverse such test zone was less than that required at the highest lawful speed, so that a violation has occurred, such camera recording will be produced; otherwise such recording will not be produced, but the rotary mass will eventually be returned to its original or normal, spring rewound, condition and position, preparatory to receipt of a signal from a succeeding vehicle traversing the first tape across the highway and defining the start of the test zone. The equipment hereinafter to be described is such that in any case, either a recording of a violation or a non-recording due to non-violation, the rotary mass will continue its rotary movement to terminus (slightly less than a full rotation); and provision is made for then restoring such rotary mass to its initial position preparatory to the succeeding operation.

Provision is also made, when a recording of a violation is made, for producing a high power flash at the instant of traverse of the second or terminal tape, thus more exactly defining the rotated position of the rotary mass at the instant of completion of traverse of the test zone. The operation of the camera is produced electromagnetically by the same signal which is used for production of such flash.

It is now evident that the actual production of the recording is produced without need of stopping the rotary movement of the rotary mass, since such recording is actually produced by the high speed flash which is directed towards the rear portion of the offending vehicle. Thus there is no loss of time incident to such actual recording, with corresponding accuracy and dependability of the recorded data.

In the drawings hereinafter to be described, I have shown circuitry suitable for producing the intended operations, and I have also shown schematically, a block diagram of the main components incident to the intended operations. The circuitry shown in such circuit diagram includes a number of high speed relays. However, it is here noted that the production of the camera recording, together with the flash incident thereto, requires the operation of only a single high speed relay, activated by the signal from the second tape, so that a delay of the order of possibly one millisecond is all that is incident to the production of the camera operation, together with the flash therefor.

While I have, in such block diagram, and in such circuitry shown the use of such high speed relays as above explained, it is evident that circuitry embodying electronic elements, such as transistors and the like may also be used, within the scope of my present invention, and without the exercise of the inventive faculty.

Comparison of FIGURES 1 and 2 shows that the recorded speed condition (FIGURE 2) includes not only the showing of the speed at which the test zone was traversed, but also the rear portion of the vehicle, including the license plate, and other characterizing and identifying features by which the identity of the violating vehicle may be lawfully proven. Since the speed recording is a photographic record made from the indicia carried by the rotary mass element, whereas the identity recording is made directly from the offending vehicle, provision is made for bringing together on the camera film proper focus of both sets of indicia. The means whereby this result is accomplished will be disclosed hereinafter.

Other objects and uses of the invention will appear from a detailed description of the same, which consists in the features of construction and combinations of parts hereinafter described and claimed.

Figure 1:
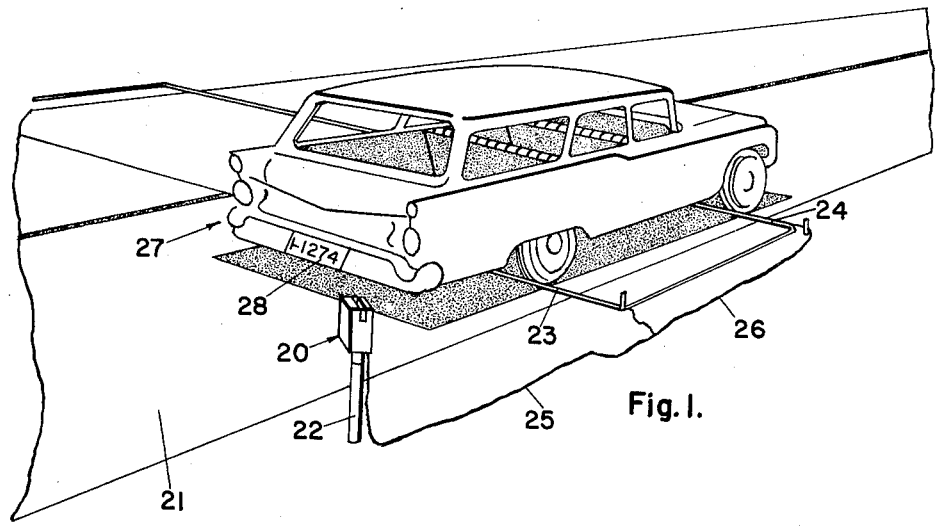
FIGURE 1 shows a typical section of roadway comprising a test zone, with the first and second signal producing tapes extended across such roadway, and a vehicle passing through the test zone; and this figure also shows the equipment of the present invention supported by a post located close to the test zone, and connected to the two tapes for receipt of the signals from them.
Figure 3:
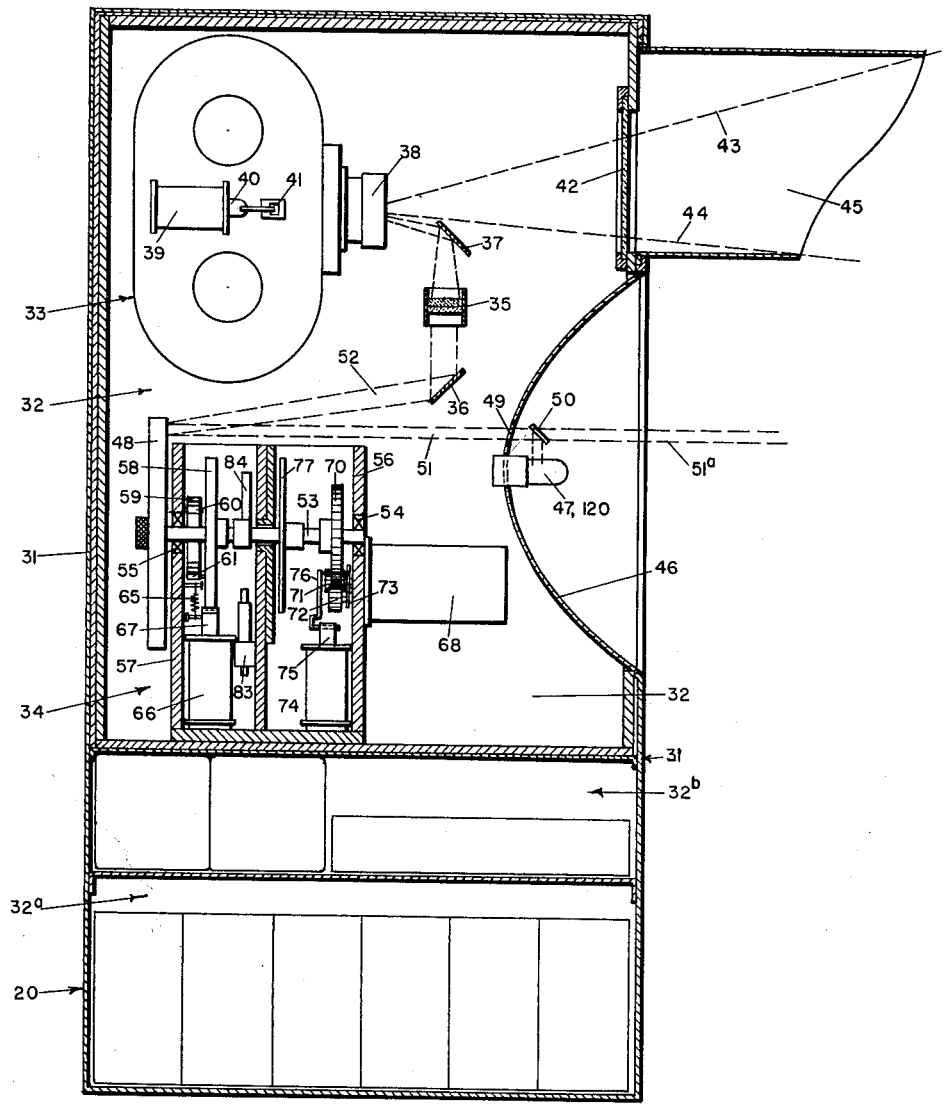
Figure 4:
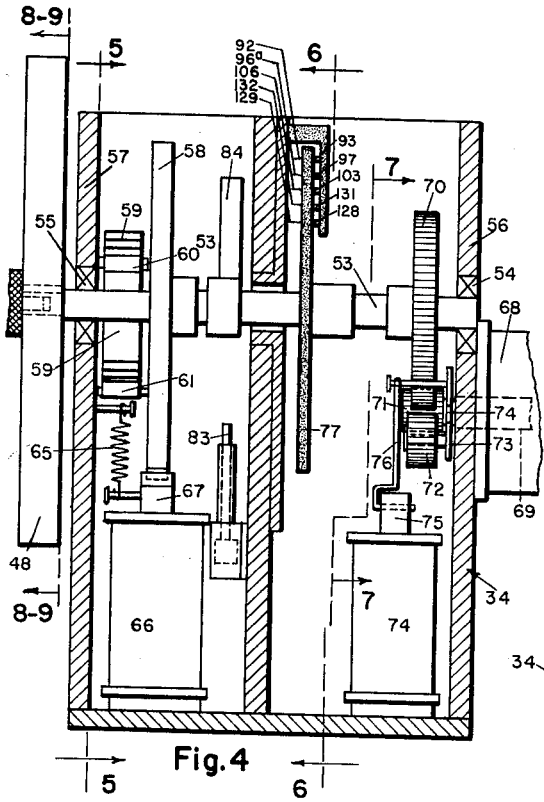
Figure 6:
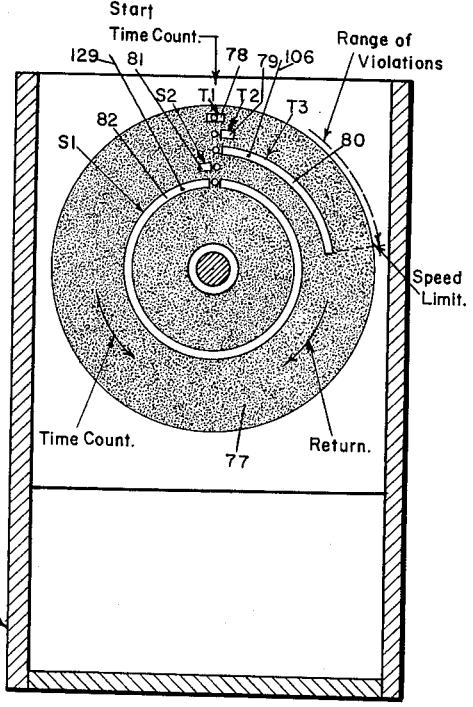
Figure 5:
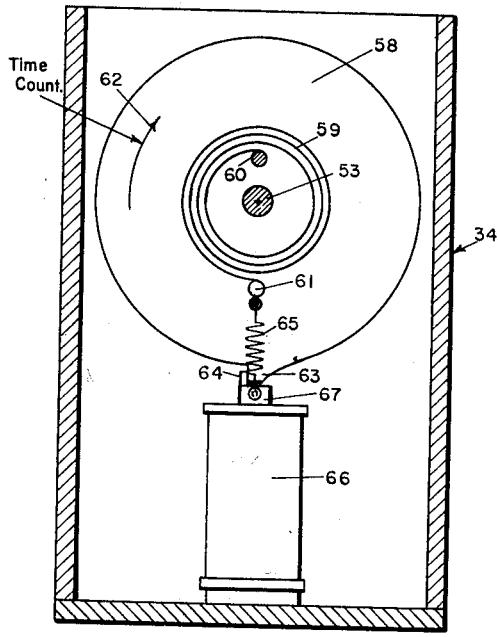
Figure 7:
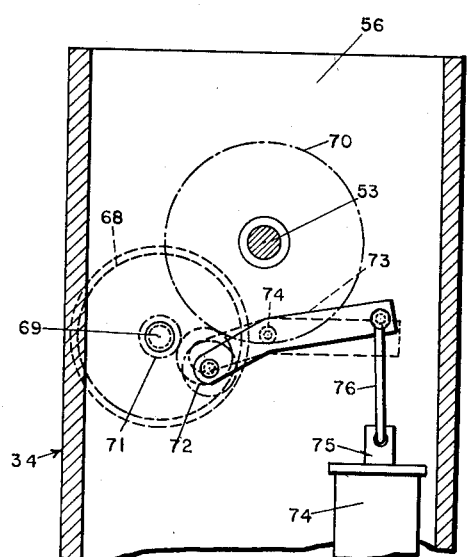
Figure 8:
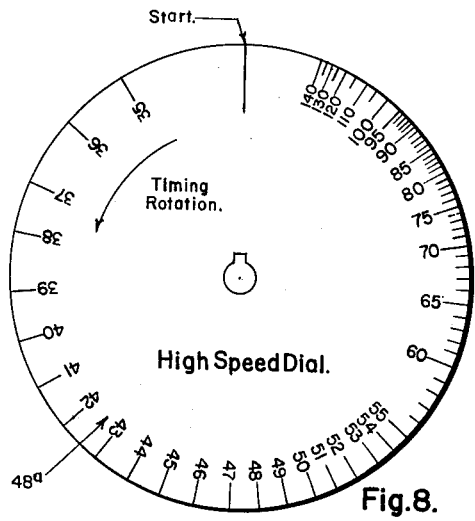
Figure 9:
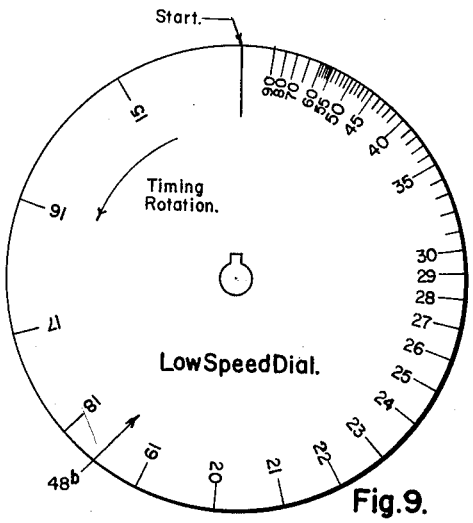
Figure 11:
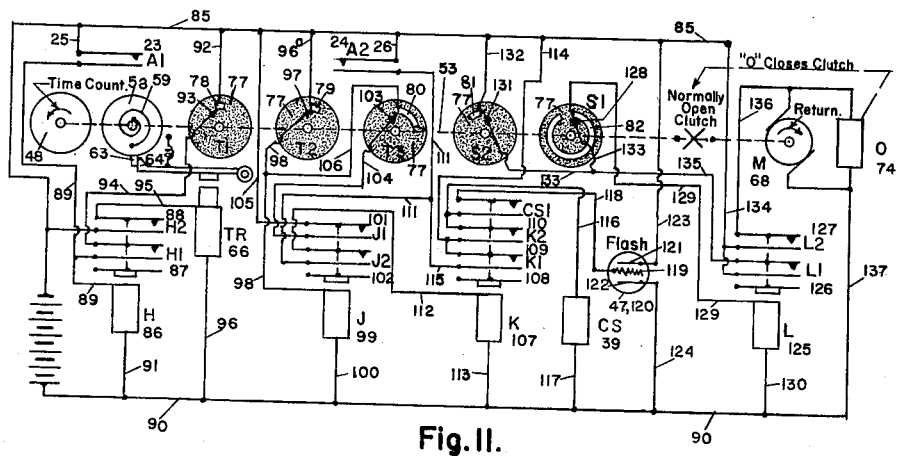
Figure 10:
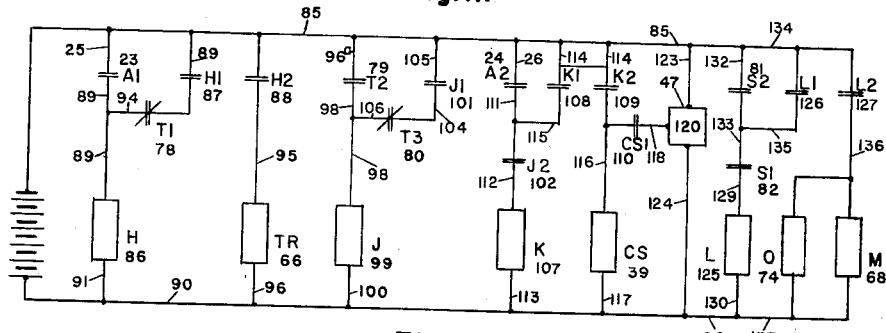

FIGURE 3 shows a vertical section through the recording unit enclosed in a suitable weather proof housing, being the unit carried by the post shown in FIGURE 1; and this FIGURE 3 shows the camera unit in place to receive, through a set of properly located mirrors and lens system, the reflected light from that portion of the speed indicator or timer, at which the speed of the vehicle through the test zone is shown, to record such speed photographically on the same frame of the film as carries the identifying picture of the offending vehicle;

FIGURE 4 shows, on enlarged scale, in section, that portion of FIGURE 3 which illustrates the timing mechanism and directly related elements, the timing elements being shown in their initial or unoperated-time-counting position;

FIGURE 5 shows a cross-section taken on the line 5—5 of FIGURE 4, looking in the direction of the arrows; and this figure shows, by the arrow, the direction of time counting rotation produced by urge of the spiral spring when the timing elements are released by the incoming of the signal from the first tape, the timing elements having not yet been released in the showing of this figure;

FIGURE 6 shows a cross-section taken on the line 6—6 of FIGURE 4, looking in the direction of the arrows; and this figure shows principally, the several contact element (schematically shown) which are under time lapse control, in their relation to the initial or starting position of the timing elements, shown by the arrow; and in this figure I have also included by schematic showing certain contact elements which may, if desired, by separated from such timing unit, this being true in the case of the time lapse counter which produces circuitry changes at the instant of conclusion of that time lapse which corresponds to the specified "speed limit" for which the unit is calibrated, and corresponding to the selected spacing of the two tapes from each other;

FIGURE 7 shows a cross-section taken on the line 7—7 of FIGURE 4, looking in the direction of the arrows; and this figure shows a convenient form of "clutch" by which the timer returning motor may be drivingly engaged with the time count elements, only during the returning (spring re-winding) operation to be performed after the timer has completed slightly less than one complete rotation, to reset such timer unit to its initial position, preparatory to making the succeeding recording;

FIGURE 8 shows a cross-section taken on the line 8—8 of FIGURE 4, looking in the direction of the arrows; and this figure shows the peripheral speed indicating markings on the mass unit shown at the left-hand side of FIGURE 4, such markings corresponding to a pre-selected "high-speed" recording operation—that is, a recording operation on a section of roadway where the speed limit lawfully proclaimed is "high"; it being noted that the unit shown in this figure is removable from the timer shaft for replacement for some other indicating mass unit;

FIGURE 9 is a section taken on the line 9—9 of FIGURE 4 (being the same section line as is used for FIGURE 8); but the timer element shown in FIGURE 9 is marked with indicia corresponding to a "low" speed lawful speed limit; and the mass of the unit thus shown in FIGURE 9 is different from the mass of the unit shown in FIGURE 8, so that such unit, when used, may be brought into calibration for accurate recording of the "low" speed conditions;

FIGURE 10 shows, schematically, a block diagram of a circuitry by which the desired operations and recordings may be produced with the equipment shown in other figures; and FIGURE 11 shows a wiring diagram of circuitry corresponding to the block diagram shown in FIGURE 10; it being noted that such wiring diagram includes several relays of conventional form; and it being understood that other elements such as electronic elements may be used, including transistors where proper, in place of the elements shown in FIGURE 11, and including, if desired suitable electronic time delay elements in place of the rotary contact elements shown in portions of FIGURES 6 and 11, as will be hereinafter explained.

Figure 2:
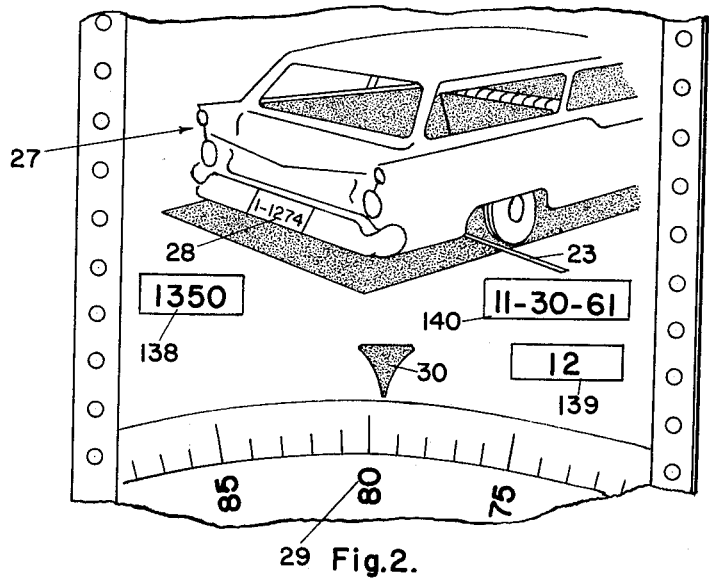
FIGURE 2 shows a typical "frame" of the camera produced by equipment embodying features of my present invention; and this figure shows not only the recorded speed of the vehicle, but also the rear portion of such vehicle, for identification purposes.

Referring first to FIGURES 1 and 2, the testing and recording unit 20 is mounted close to the highway 21 which is to be surveyed for violators of the stated speed limit. Such mounting is conveniently provided by the post 22 permanently or otherwise set adjacent to such highway, with the unit 20 at an elevation proper for production of the picture of the rear portion of the vehicle, including the license plate of other indicia of ownership or responsibility for the driving of the vehicle. The details of such unit 20 will be described hereinafter.

The first and second pressure responsive electrical contact producing tapes 23 and 24 are set directly across the highway lane which is to be surveyed, being retained in position by convenient means, such as adhesive tapes or the like. By removably attaching the unit 20 to the post, and by using detachable means to retain the tapes in position across the highway, the equipment may be moved from point to point, for testing speed conditions at different sections of the highway.

The two tapes are thus secured in place at an accurately measured separation from each other, providing a test zone of known length, and conformably with the calibration requirements of the setting of the test unit itself. By thus setting the tapes at such known separation along the highway, so that the distance traversed between the incoming of signals from the two tapes, the calibration of the unit 20, for production of recordings in m.p.h., may be exactly produced on the basis of elapsed time between the incoming of the two signals. Or, in case the elapsed time between such two signals is longer than the known time to traverse the test zone at speed less than the "speed limit," provision may be made within the unit 20 for rejecting the test, and producing no recording thereof. Such unit 20 includes means to effect such selective operation.

The lines 25 and 26 lead from the two tapes to the unit 20, and will be referred to hereinafter.

FIGURE 2 shows a typical recording of a speed violation, produced by my present equipment. The picture 27 of the rear end portion of the offending vehicle shows the license plate 28 by which, in addition to the showing of the vehicle itself, proper identification of the offending vehicle may be ensured. It is noted that the rear wheels of the vehicle have just passed over the first tape, and that a like condition obtains as respects the relation of the front wheels to the second tape 24. Under the conditions thus shown in FIGURE 2 the second tape signal has been delivered, thus bringing into operation the recording elements presently to be described; and it is also noted that under the conditions thus illustrated a second signal is delivered by the first tape. It will be hereinafter shown that such second signal from the first or zone entering tape is ineffective to interfere with proper and accurate recording of the speed between the two tapes as determined by the signal produced by the second tape 24. The speed of the vehicle as determined by the elapsed time to traverse the test zone, is also shown at 29 in FIGURE 2, and as indicated by the pointer 30. This recording of speed is produced on the same frame as carries the picture of the vehicle itself; and the means whereby the above result is produced will appear hereinafter. It is understood that all of the showing of FIGURE 2 is contained within a single "frame" of the single step moving picture camera, presently to be described.

Reference is now invited to FIGURE 3 which shows a vertical section through the unit 20, based on a broken plane through the central portion of the unit 20. This figure shows that the weatherproof housing 31 is conveniently divided into an upper compartment 32, a battery compartment 32a in the lower part of the housing, and an electrical components compartment 32b in the central portion of the housing. The upper compartment 32 accommodates the camera 33, the time-counting and speed indicating unit 34, and certain lens and reflector elements 35, 36, and 37, by which certain images are delivered to the camera lens element 38 for simultaneous production of the picture of the rear of the offending vehicle, as well as the image of the determined speed through the test zone, as shown on the scale of the unit 34. Such camera is provided with the one-step release solenoid 39 having the armature 40 which engages the camera release finger element 41, which when drawn back ensures exposure of one frame of the film with proper film advance to bring the next frame into position for receiving the image of the succeeding test. One-step moving picture cameras are well known in the arts, and it is thus deemed unnecessary to illustrate in detail such camera elements.

The housing is provided with the camera window 42 in alignment with the camera lens system and serving to deliver to such lens system the illumination from the vehicle portion to be photographed, being a zone defined by the upper and lower limits 43 and 44, respectively, and of width needed to ensure proper identification of the vehicle by examination of its picture, including its license plate. A hood 45 is shown in advance of such window to protect it from deposits of rain, snow, sleet, and other weather elements which might otherwise occur on such window, with consequent interference with the production of a clear and certainly identifiable image of the offending vehicle.

In order to ensure ample illumination of the offending vehicle at the instant of picture taking, especially at night and under weather conditions producing poor illumination, I have provided the parabolic reflector 46 in the front wall of the housing 31, together with a flash lamp 47 of sufficient power (flash illumination) to brightly illuminate the rear portion of the offending vehicle for a short interval (of the order of a millisecond or fraction thereof), the activation of such flash lamp being timed to coincide with the open condition of the camera shutter.

At this point I mention that the speed of the vehicle as determined by the presently to be described timing equipment, is shown by a circular scale carried by the front peripheral portion of the rotary mass element 48 (two of which elements are shown in FIGURES 8 and 9, presently to be described). The parabolic reflector 46 is provided with a small opening 49 through which may be reflected a small portion of the flash light produced by the element 47, a small reflector 50 being secured to the front face of the parabolic reflector to retain such small reflector in proper position to reflect a small amount of the bright illumination produced at the instant of flash, backwardly and against the peripheral portion of such rotary mass element 48, as shown by the lines of illumination, in FIGURE 3. The momentary bright illumination thus produced against such peripheral portion of the rotary mass element, is then reflected forwardly on a slight angle as shown by the lines of illumination 52 in FIGURE 3. Such beam 52 includes the indicia of speed as determined and shown at the instant of flash, so that such speed indicia are transmitted by the beam 52 to the reflector 36, up through the lens system 35, and to the reflector 37, there to be directed into the lower portion of the camera lens, for producing the photographic recording of speed on the frame then exposed, and as shown in FIGURE 2.

The small lens system shown at 35 is designed and acts to compensate for differences in focal length of the beams coming from the offending vehicle, and from the flash light, so that clear distinct images of both sets of beams are produced on the film frame.

Referring next to FIGURES 4 to 9, inclusive, the timing unit assembly is there shown in detail. This unit is also shown at 34 in FIGURE 3 in its relation to the camera and associated elements. This unit includes the timer shaft 53 journalled at 54 and 55 in the front and rear walls 56 and 57, respectively of the housing or frame which includes such timer elements. Such bearings are preferably of anti-friction type to ensure the least interference with free rotation of the rotary mass under urge of the spring element. The disk 58 is secured to such timer shaft; and the spiral spring 59 surrounds the shaft adjacent to the rear face of the disk. The inner end of this spring is anchored to the rear wall 57 of the housing by the stud 60, and the outer end of the spring is connected to the rear face of the disk by the stud 61. Such spring is pre-loaded when the disk occupies its initial or normal, spring wound angular position, so that the spring always produces unwinding urge torque to rotate the disk (and the shaft to which the disk is connected), such torque acting to produce clockwise disk rotation (see the arrow 62 in FIGURE 5).

A shouldered abutment 63 is provided on the edge of the disk so that a vertically movable tooth 64 beneath the disk will, when raised, provide a stop to retain the disk in spring wound position, and against the spring urge tending to produce disk (and shaft) rotation. Such stop is normally retained in its raised position by the light spring 65; and a solenoid and armature element 66–67 is provided for retracting the tooth downward upon energization of such solenoid, thus releasing the disk for accelerating rotation under urge of the wound spring 59. Thus a very fast release of the disk and connected parts, occurs upon energization of the solenoid, for prompt start of the time count, and determination of such time count based on the rotated position of the disk and connected parts at the instant of incoming of the signal from the second tape. It noted that the maximum time count needed for any intended recording operation of the equipment will be produced during rotation of the disk less than a complete rotation. Thus the abutment 63 will not come around to the location of the tooth 64 during the time counting operation.

During re-wind of the spring and restoration of the disk and connected parts, produced by reverse rotation of the shaft 53 the disk 58 is carried counterclockwise (in FIGURE 5) far enough to cause the right-hand cam face of the abutment 63 to depress the armature and the tooth 64 slightly past the engaging position of such abutment and tooth, with snap rise of the tooth and armature under urge of the light spring 65 to lock the rotary parts in the starting position, preparatory to the next operation. The means to produce such reverse rotary re-wind operation, will appear hereinafter. Any slight excess reverse rotation during such re-winding operation, will be erased by renewed engagement of the abutment with the tooth 64 when the re-wind clutch is disengaged at conclusion of the re-wind.

The restoration of the disk and shaft is produced by motor drive instituted at completion of the slightly less than one complete rotation of the parts. During such operation the disk and shaft are rotated reversely, or counterclockwise when viewed as in FIGURE 5. This operation is produced by the following means (see FIGURES 4 and 7):

A small motor 68 is mounted on the outside face of the front wall 56 of the housing, with the shaft 69 of such motor extended through such wall to the inside of the housing at a location close to, but not in engagement with the gear 70 mounted on and secured to the shaft 53. The inner end of such motor shaft carries a pinion 71, not directly in mesh with such gear 70 but facially aligned with such gear as shown in FIGURE 4. Clutch means is provided between the motor pinion and the shaft gear. Such clutch means is normally disengaged, so that the gear (and the shaft 53) may rotate free of the motor and its pinion; but by engaging the clutch, driving engagement is produced from the motor pinion to the gear. Then by motor rotation in the proper direction the shaft (and the connected mass elements) is rotated counterclockwise (viewed as in FIGURES 5 and 7) to restore the shaft and connected mass elements to their initial position, and with the tooth latched to retain the disk and shaft in their initial position. Reference to FIGURES 4 and 7 shows a convenient form of clutch for performing the reverse and re-wind operation, as follows:

An idler pinion 72 is journalled to a lever arm which is pivoted to the inner face of the front wall 56, such lever arm being numbered 73 and pivoted at 74. Normally such lever arm stands in the downwardly tilted position shown by full lines in FIGURE 7; but by rocking such arm clockwise into the dotted line position the idler pinion is brought into mesh with the motor pinion 71 and with the gear 70, thus drivingly connecting the motor to the shaft 53. Such clockwise tilt of the arm 73 is produced by energization of the solenoid 74 whose armature 75 is connected to the lever arm by the link 76. Provision is made for energizing both the motor and the solenoid simultaneously to produce the desired reverse drive of the shaft 53 and connected parts, and for discontinuing such energization at completion of the returning rotational movement of such parts. Such provisions will be desiribed hereinafter.

Circuitry is provided for activating and controlling the various elements above described. Included in such circuitry are certain elements for switching operations properly timed or synchronized with respect to the rotational operations of the mass, shaft, and other connected elements. Some of these switching operations may conveniently be produced by arcuate contacts rotating with the shaft, and engaged or disengaged by stationary contacts, according to conventional practice. Others may be in the form of stationary switching elements actuated by movable contacts under shaft rotation control. In FIGURES 3, 4, 6 and 10 I have shown the disk element 77 mounted on and drivingly connected to the shaft 53. This disk may conveniently be of "printed circuitry" type, or it may be a disk of insulating material carrying the several arcuate contacts embedded into its face, and of arcuate length and location to produce, in connection with stationary contacts, the desired circuitry controls. The latter form of arrangement is illustrated by way of illustration only, and not as a matter of limitation, except as I may limit myself in the claims to follow. Such disk as illustrated includes the arcuate contacts numbered 78, 79, 80, 81 and 82. Examination of FIGURE 6 shows that the starting and terminating ends of these contacts bear certain angular relations to each other. I shall not here explain the functions and relations of such contacts to each other; but here call attention to the fact that the contacts 80 and 81 produce special functions, and that in some embodiments of my present invention it may be found desirable to substitute other forms of switching elements for such arcuate types as shown in such figures. In this connection the following explanation is here pertinent:

The contact 80 as shown in FIGURES 6 and 11 constitutes a time lapse measuring contact—that is, it is of characteristics such that it produces its signalling function during a time interval, commencing at the instant of incoming of the signal from the first tape, exactly equal to the time needed to traverse the test zone at the specified high speed to which the testing equipment is designed or set. Thus, such arcuate contact extends from a stationary contact position around to a position which will reach such stationary contact at exactly the conclusion of such stated time interval needed to traverse the test zone under the stated high lawful speed in question, under the conditions of acceleration of the total mass of the rotating elements. At such instant such arcuate contact 80 ceases to perform its circuit closing function, thus altering other functions of the equipment. Such other functions include primarily, the disabling of the camera operation, including the disabling of production of the high speed high intensity light flash. Having thus altered the other circuitry, the rotation of the mass and shaft, etc., may continue to almost the full rotation, whereupon a reverse drive of the motor and under clutch operation will occur, to return the operative parts to their initial positions, preparatory to institution of the succeeding test operation. It is thus apparent that the characterisics of such circuit element must be such as to produce a time measuring operation equal to the time lapse which must occur during travel of the front wheels of the vehicle from the first test tape to the second one.

The showing of such element 80 in FIGURES 6 and 11 is thus schematic and other switching elements may be substituted therefor, having capabilities of time measuring between two signalling conditions.

In connection with this element the following comments are further proper:

It is evident that the time lapse measured by such element 80 must correspond to the time lapse needed for the disk which carries the indicia of speeds to move from its initial position to its position of indication of the specified high lawful speed. In FIGURES 8 and 9 two such disks are shown, one for the high speed limit (e.g., 80 m.p.h.) and the other for the low speed limit (e.g., 30 m.p.h.). Reference has also been made to the ability to select either of such two (or more) high speed limits by substitution of the proper disk onto the shaft 53. It is now evident that such a change in the prescribed high speed limit must also be accompanied by change of the time measuring function of such contact 80 (or equivalent contact element). This would, in the case of incorporation of such contact 80 on the disk 77, require substitution of an alternative such disk 77 to correspond to the new time lapse corresponding to such newly chosen high speed limit. To avoid the need of thus changing the disk 77 it is possible to incorporate the functions of such contact 80 into a separate switching element, separate from the disk 77. It is thus seen that the showing of the several arcuate contacts 78, 79, 80, 81 and 82 carried by the disk 77, is schematic and is not made as a limitation of the features of the present invention, but by way of illustration, only.

Examination of the disks shown in FIGURES 8 and 9 shows that the spacings between successive speed indications in the lower speed locations are much greater than are the spacings in the higher speed locations. In fact the spacings are progressively smaller as the starting position is approached, but theoretically the starting position would never be reached (for the speed indications) since that location would represent traverse of a finite distance within zero time, an impossibility, and corresponding to infinity in speed. The progressive increase in the spacings between speeds of successive equal increments, as the slow end of the scale is approached, will depend on the manner and progress of the acceleration to which the rotating mass is subjected. That acceleration may be constant, as would be the case when the acceleration was produced by constant application of a uniform torque to the rotating mass. Such an arrangement might be produced by using the constant force of a descending weight acting on a drum of uniform diameter. The use of a torque producing spring, as illustrated presents various advantages, including simplicity of structure, compactness of size, low cost, ready calibration, ability to produce the springs to close tolerances of specifications, etc. Furthermore, when using such a spring arrangement it is possible to pre-load the spring, so that even at the final stages of unwinding (that is, approach to the complete rotation), sufficient torque will remain to ensure continued acceleration of the mass.

Since the spaces between successive speed markings on the dial increase as the lower speeds are entered, it is possible to select specifications for the springs as compared to the rotational inertias of the masses, such that at and near the high lawful speed such spacings are sufficiently large to ensure accurate readings of the recordings near such lawful speeds. Thus the certainty of production of recordings which will be legally acceptable as evidence, is increased, and the recordings produced by units embodying features of my present invention will receive a high degree of acceptability for their intended purposes.

It should be noted that the "Time Count" direction indicated by the arrow in FIGURE 5 is clockwise, whereas the Time Count direction indicated in FIGURES 6, 8, 9 and 11 are counterclockwise. This showing is correct in all instances since the viewing the the rotary mass shown in FIGURE 5 is the left-hand face of the disk 58, whereas the showings of the other figures are the right-hand faces of the illustrated elements.

In FIGURE 4 I have shown the switch element 83 mounted stationary beneath the shaft 53, together with an arm 84 carried by such shaft and rotating therewith, and of length to actuate such switch at conclusion of the rotation of the rotary mass in the time count direction. Such switch is an alternative element which may be used in substitution for the contact 81 shown in FIGURES 11 and 6, and therefore requires no discussion other than that which will be made presently, respecting the circuitry and functions of the circuit elements.

Reference is next made to FIGURES 10 and 11, showing, respectively, a block diagram of the various operative elements, and a circuitry suitable for producing the desired functions on the basis of such block diagram. These figures embody the following:

The first and second tape contacts are shown at $A_1$ (23) and $A_2$ (24), connected to the supply line 85 by the lines 25 and 26, respectively. The short impulse produced by momentary closure of the first tape contact energizes relay H (86), thus momentarily pulling in contacts $H_1$ and $H_2$ (87 and 88, respectively). To this end, tape contact $A_1$ (23) connects by lead 89 with one end of solenoid H (86), the other end of such solenoid connecting to the other bus line 90 by the lead 91. The contact 78 on the disk 77 connects with the bus line 85 by the lead 92. The contact 78 engages a stationary contact 93 when the disk 77 and shaft 53 and connected parts are at their initial or starting position. The contact 93 connects by the lead 94 with the contact $H_1$ (87). Thus, as soon as the relay H (86) is pulled in by the short impulse from the first tape current may flow from bus 85 to the solenoid of such relay, to hold the relay in activated condition during start of the disk rotation and until the contact 78 leaves the stationary contact 93. During this interval the contacts $H_2$ (88) are also engaged. One of such contacts connects by the lead 95 with the solenoid of the relay or element TR (66), the other end of such solenoid connecting by the lead 96 with the bus 90. The contact 78 is of length ample to ensure actuation of the solenoid TR and disengagement of the tooth 64 from the abutment 63. Thus the disk 58 and connected parts are released to allow the spring 59 to commence rotation of the mass for the time count. After a short amount of such rotation, as already explained, the contact 78 will move away from the stationary contact 93 with corresponding discontinuance of energization of the solenoid, and release of the tooth 64 and shift of such tooth upward to engage the periphery of the disk 58, under urge of the light spring 65. Thus, at conclusion of the returning rotary movement in reverse direction, under motor drive, such tooth will be in position to again lock the disk 77 and connected parts in their initial or starting position.

The contact $T_2$ (79) on the disk 77 will engage a complementary stationary contact 97 after a short angular travel of the disk and shaft 53 and connected parts from their initial or starting position. Such stationary contact 97 connects by the lead 98 with the solenoid of the relay J (99), and the other end of such solenoid connects by the lead 100 with the bus 90. Such relay J (99) includes the contact $J_1$ (101) and $J_2$ (102) which close when the relay is activated. Thus such relay is activated shortly after commencement of rotation of the parts for the time count by energization of its solenoid by current delivered through the contacts 79 and 97. Such disk contact 79 is of short angular arc so that after a short amount of rotation during the time count such contact departs from the stationary contact 97. This would allow such relay to be de-activated, but provision has been made to continue activation of such relay during an interval of time needed for the time count of that interval required for traverse of the distance between the two tapes (test zone length), at the highest permitted legal speed. Such provision is as follows:

The contact $T_3$ (80) carried by the disk 77 extends from a point just beyond the initial or starting position of the disk, through an arc equal to the rotation of such disk which will occur between the starting instant and that interval when a time lapse has occurred equal to the time of traverse the test zone at the highest permitted lawful speed. Thus, after commencement of disk rotation the engagement of the arcuate contact 80 will continue during an interval terminating with the time to traverse such test zone distance at such high lawful speed. Then the engagement of such arcuate contact with such stationary contact will cease. Such stationary contact 103 connects with the relay contact $J_1$ by the lead 104, and the other side of such relay contact $J_1$ (101) connects by the lead 105 with the bus 85. The arcuate contact 80 connects to the lead 98 by the lead 106 which, as already shown, connects to the solenoid of the relay J (99). Accordingly, after termination of the engagement of the short contact 79 with its companion stationary contact 97, current will continue to supply the solenoid of the relay J (99) as long as the arcuate contact 80 engages its companion stationary contact 103. That interval is, as shown, the time to traverse the test zone at the highest lawful speed. At conclusion of such time interval relay J (97) will be de-energized and its contacts $J_1$ (101) and $J_2$ (102) will open.

Relay K (107) actuates the three sets of contacts $K_1$ (108), $K_2$ (109), and $CS_1$ (110). The second tape contact $A_2$ (24) connects by the line 111 with one end of the solenoid of such relay K through the lines 111 and 112 and the contacts $J_2$ (102). The other end of such solenoid connects to the bus 90 by the line 113. Thus the momentary impulse given by the second tape and its contact $A_2$ (24) serves to momentarily close such relay's contacts. The line 114 connects the bus 85 with one side of each of the contact pairs $K_1$ (108) and $K_2$ (109). The other side of the contact pair $K_1$ (108) connects to the line 111 by the lead 115. Accordingly, when the relay J (99) closes, and as long as it remains closed, (so that its contacts $J_2$ (102)) are engaged, the relay K (107) will first be closed by the impulse from the second tape acting through the instrumentality of the contacts $J_2$ (102), and thereafter such relay K (107) will remain activated as long as, but no longer than, the activation of the relay J (99) continues. That interval has been shown to be the time required for a vehicle travelling at the highest lawful speed, to traverse the test zone distance. Then, due to the opening of the relay J (99) with consequent separation of the contacts $J_2$ (102), feed of current to the solenoid of the relay K (107) will terminate and such relay will open. Accordingly any functions whose performance is predicated on the closed condition of the relay J (99), cannot occur after lapse of the time interval needed to traverse the test zone at the highest lawful speed. Thus, too, speed conditions less than that highest lawful speed cannot be registered, if their registering is predicated on the closed condition of such contacts $J_2$ (102). If, however, the tested speed is greater than such lawful speed, so that the time to traverse such test zone is within the interval when such contacts remain closed, registration may be made, as hereinafter explained. Such registration comprises the production of the record of speed of the vehicle, and its identification as already explained.

It is now seen that activation of the relay K (107) is instituted by the short impulse delivered by the second tape as the front wheels of the vehicle passes over such tape; but that thereafter the continued activation of such relay is controlled and limited by the arcuate contact 80, such limitation occurring when the arcuate contact separates from the stationary contact 103. Also, that such initial activation of such relay K (107) can occur only if, at the time of incoming of the signal from the second tape $A_2$ (24) the arcuate contact 80 is still engaged with its companion stationary contact 103, since, after the initial short impulse delivered through the short contact 79 and its companion staionary contact, the arcuate contact 80 has moved past its stationary contact 103, the continuity of current supply to the relay J (99) will have ceased so that its contacts $J_2$ (102) will have separated, and no current will be delivered to the solenoid of such relay K (107). Thus, when the second tape produced impulse arrives after a time interval corresponding to the highest lawful speed, (that is, when such tape signal arrives after lapse of a time longer than that corresponding to the high law speed), the relay K (107) will not be activated, and it will not then perform its intended functions. Such functions of the relay K (107) relate to the recording operations produced by the camera, including production of the high intensity flash coincident with the functioning of the camera shutter, advance of the film, etc. Accordingly, the following explanations respecting such relay K (107) and related operations, are in order, as follows:

The relay contacts $K_2$ (109) and $CS_1$ (110) control the camera functions and the production of the flash light, simultaneously, at the incoming of the signal from the second tape, but only when the time lapse during traverse of the test zone is equal to or less than the time corresponding to the high speed limit. The solenoid CS (39) controls the release of the camera shutter and the film advance thereafter, to the next frame. To this end the lead 116 connects from one of the contact pairs $K_2$ (109) to the solenoid CS (39), and the other end of such solenoid is connected by the lead 117 to the bus 90. One of the contact pair $CS_1$ (110) connects by the lead 118 to the grid 119 of the flash bulb 120, and the two plates of such flash bulb, 121 and 122 connect by the leads 123 and 124 to the buses 85 and 90, respectively. Accordingly, electrification of such grid by potential arriving over the lead 118 from the contacts $CS_1$, serves to flash the bulb. That action occurs when the relay K (107) is activated, as determined by the continued engagement of the arcuate contact 80 of disk 77, with its companion stationary contact 103, and only when the time to traverse the test zone is less than the time needed under the high speed limit for which the disk $48^a$ or $48^b$ is calibrated. The operation of the camera, and the simultaneous production of the desired flash, both occur under control of the signal delivered by the second tape at the end of the test zone, and only under the condition that the speed of the vehicle through such test zone exceded that legally permitted for the test zone in question.

After rotation of the shaft 53 and connected parts to the end of the arcuate contact 80 which determines whether a recording shall be made of the vehicle's speed, etc., the rotation of such shaft and connected elements continues to a limit slightly less than one full rotation from the starting point. At such final rotation position, the shaft 53 and connected elements are rotated reversely by motor drive to the initial or starting position. The means to effect such operations include the following:

The relay L (125) includes the pairs of contacts $L_1$ (126) and $L_2$ (127). The disk 77 carries the circular contact 82 which engages the stationary contact 128 during rotation of the shaft 53 and connected parts; but such circular contact does not embrace the entire circle, leaving a short gap as shown in FIGURES 6 and 11. At the initial or starting position of the parts such gap registers with the stationary contact 128, but slight rotation in the time count direction brings the circular contact into engagement with such companion stationary contact 128. Such engagement continues during rotation of the shaft 53 and connected parts to the terminal position of such rotation (being slightly less than a complete rotation).

One end of the solenoid of relay L (125) connects by the lead 129 to the circular contact 82, and the other end of such solenoid connects by the lead 130 to the bus 90. Accordingly, as long as the circular contact is in engagement with its companion stationary contact 128, such solenoid will be pulled in, assuming that proper supply of current to the stationary contact 128 exists. Such current supply is provided as follows:

The short contact $S_2$ (81) on the disk 77 normally stands at position slightly beyond the initial or starting position of the shaft 53 and disk 77, as shown in FIGURES 6 and 11. The stationary contact 131 is provided just behind the position of the short contact 81 when at its normal position, so that engagement of the short contact with the stationary contact does not occur until completion of the rotation of the shaft 53 and disk 77 in the time count direction. At completion of rotation in the time count direction engagement of the short contact with the stationary contacts occurs and will continue for a short amount of rotation in the reverse direction.

The short contact 81 connects to the bus 85 by the lead 132. Accordingly, the stationary contact remains non-electrified at all times except for a short interval at completion of rotation of the parts in the time count direction. The stationary contact 131 connects to the stationary contact 128 of the element $S_1$ which carries the circular contact 82, by the lead 133. Study of the relations so far disclosed will show that with the foregoing elements, a short impulse of current will be delivered from the short contact 81 to the stationary contact 131, over the line 133 to the stationary contact 128, and then through the circular contact 82 to the line 129 and solenoid of the relay L (125), such short impulse occuring at the time the rotating parts reach their terminus in the time count direction. Thus the relay L (125) is pulled in at conclusion of the rotation in time count direction. But provision is also made for retaining such relay in such pulled in condition during reverse rotation of the parts to their initial or starting position. Such provision includes the following:

One contact of each of the pairs of contacts $L_1$ (126) and $L_2$ (127) of the relay L (125) is connected to the bus 85 by the line 134. The other contact of the pair $L_1$ (126) connects by the line 135 to the line 133. Accordingly, as soon as the short impulse produced by the short contact 81 pulls in the relay L (125) circuitry is established to also supply current to the solenoid of such relay from engagement of the circular contact 82 with its companion stationary contact 128, and such current supply may continue until the parts have been returned to their initial or starting position by motor drive. Thereupon the circular contact will just leave its companion stationary contact to discontinue motor drive, and clutch operation, leaving the parts in their intended conditions, preparatory to commencement of another set of operations. The motor drive arrangements for producing reverse rotation include the following:

The terminals of the re-set motor M (68) and of the clutch solenoid O (74) are connected together in parallel, as shown in FIGURES 10 and 11. The terminal lead 136 thus connects to one contact of the pair $L_2$ (127) of the relay L (125); and the other contact of such pair connects to the lead 134 which connects to the bus 85. The other terminal lead from the motor-clutch combination connects by the lead 137 to the other bus 90. It is thus evident that activation of such relay L (125) produces motor drive and also actuation of the clutch to bring such motor drive into engagement with the shaft 53 and its connected parts. Also, that such activation of both the motor and the clutch must terminate synchronously with return of the shaft 53 and connected parts to their initial or starting positions, since supply of current to the motor and clutch must terminate when the circular contact 82 of the disk 77 returns to its initial position, with opening of the circuit leading to lead 129.

The indicia 138, 139 and 140 are shown on the record illustrated in FIGURE 2. These correspond to records which are kept for identification of the times of recording, and other data significant to the production of legal proof or otherwise. They may be produced automatically if desired; but the details thereof constitute no portion of the present invention.

In FIGURE 3 I have shown the light beam 51, produced by reflection from the reflector 50, as supplemented by a continuation beam $51^a$ coming from behind such mirror. Such an arrangement might be used when the mirror comprises a plain, unbacked mirror or reflecting surface, such as a sheet of glass, capable of both reflection of light derived from the flash bulb, and light derived from outside of the unit, and comprising transmitted light instead of reflected light.

Reference has previously been made to the space between the first and second tapes in relation to the wheel base of the vehicle traversing the test zone. Examination of FIGURE 11 will show that in case of passage of a wheel over the first tape prior to completion of the reverse rotation of the shaft 53 and connected parts, such second contacting of the first tape will only deliver a short impulse to the solenoid of the relay H (86), and possible quick withdrawal of the tooth 64 by energization of the solenoid TR (66); but until complete return of the shaft 53 and connected parts to their initial or starting position, the short contact 78 on the disk 77 will not be in engagement with its companion stationary contact 93, so the relay H (86) will immediately release, with corresponding termination of the above stated withdrawal of the tooth 64. Also, until complete reverse return movement of the parts under motor drive to their initial position, the abutment 63 on the disk 58 will not have returned to position for the production of any deleterious effect due to the momentary withdrawal of the tooth 64 by such impulse delivered by the first tape contacting. Thus the provision of a test zone of length substantially as great as the conventional wheel base will not produce undesired double signalling. Further exploring the relation of the length of the test zone in comparison to the wheel base length the following operational conditions will be disclosed:

If the length of the test zone between the two tapes is materially greater than the wheel base of a vehicle, the rear wheels of the vehicle will impact the first tape prior to impact of the front wheels with the second tape. Under this condition the second impact thus delivered through the first tape will not produce a false operation since the reverse rotation of the shaft 53 and connected parts will not commence until some time after the second tape has been impacted (depending on the amount of shaft rotation needed after such impacting of the second tape to complete the rotation in the time count direction, so that the reverse rotation under motor drive may commence). It is of course to be remembered that the arcuate length of the contact 80 must in any case correspond to the time needed to traverse the test zone at the highest lawful speed, depending also on the mass of the rotating parts, the characteristics of the spring (tested by the conditions of Hook's Law), etc.

The relations and conditions obtaining in the case of a vehicle of wheel base much longer than the test zone should also be explored, as follows:

If the length of the wheel base is sufficiently greater than that of the test zone, and the actual speed of the vehicle is such that the rear wheels of the vehicle do not impact the first tape until after a time lapse sufficient to enable the rotation in the time count direction plus the time required for completion of the reverse rotation back to the starting point, the equipment will then be in condition for production of a second start of the shaft rotation, instituted by such second impacting of the first tape by the rear wheels. But prior to such second start the front wheels will have impacted the second tape to make a recording (if the speed exceeded the lawful speed), or to complete the cycle of movements in any case (even if no violation had been recorded). Such second start (by impact of the rear wheels with the first tape) would then be followed by impact of the rear wheels with the second tape to produce a second recording (if the speed still exceeded the lawful value), or to cause return of the parts to the starting point in any case. Such a second recording of a violation would then appear and be identified as having been produced by the same vehicle as produced the record of the first violation, since both violation recordings would show the same vehicle identification data, and (if the time record was also produced) that both violations occurred at almost the same instant.

The provision and use of a test zone length substantially the same as the average conventional wheel base of the vehicles traversing the highway thus presents a condition favorable to the production of the desired recordings.

I claim:

1. Means to determine and give an indication of the speed of a travelling vehicle in comparison with a predetermined speed, comprising in combination means to deliver a first defined signal when the vehicle passes the beginning of a speed test zone of pre-determined length, means to deliver a second defined signal when the vehicle passes the end of said speed test zone, a rotary mass, means to journal said mass for rotation about its axis, spring means connected to the mass and constituted to urge rotation of the mass in a time count direction during unwinding of the spring, means to lock the mass against rotation at a starting position and against the urge of the spring, means to unlock the locking means, operative connections between the first defined signal delivering means and the unlocking means, constituted to unlock the mass when the first defined signal is delivered, for release of the mass for rotation under unwinding urge of the spring, a stationary starting position indicator in proximity to the mass, indicia on the mass movable with the mass in reference comparison with said stationary statring point indicator, means to produce an indication of the moved position of the indicia in comparison with the starting position indicator, and operative connections between the second defined signal producing means and the means which produces an indication of the moved position of the indicia on the mass, constituted to activate the indication producing means when the second defined signal is delivered.

2. Means as defined in claim 1, wherein the indicia on the rotary mass are located at angular positions measured from the location of the stationary starting position indicator proportional to time intervals for angular advance of the rotary mass from the starting position under the spring urge, equal to the time intervals between the first and second identifying signals, which time intervals correspond to the indicia on the rotary mass.

3. Means as defined in claim 2, wherein said indicia each designates the vehicle speed to traverse the distance between the beginning of the test zone and the end of said test zone, corresponding to the angular position of such indicia, measured from the location of the starting position of the rotary mass.

4. Means as defined in claim 2, wherein one of the indicia on the rotary mass is located at an angular position from the stationary starting point equal to the angular advance of the rotary mass under spring urge, from its starting point, during the time interval corresponding to traverse of the length of the test zone at a specified vehicle speed.

5. Means as defined in claim 4, wherein such specified vehicle speed is a legally determined speed.

6. Means as defined in claim 4, together with means to cause production of the indication of the moved position of the indicia when said moved position is equal to the angular advance of the rotary mass under spring urge, during the time interval which corresponds to traverse of the length of the test zone at such legally determined speed.

7. Means as defined in claim 4, together with means to cause production of the indication of the moved position of the indicia when said moved position is equal to the angular advance of the rotary mass under spring urge, during a time interval less than the time interval to traverse the length of the test zone at such legally determined speed.

8. Means as defined in claim 1, wherein the means to produce the indication of the moved positon of the indicia in comparison with the starting position indicator, comprises means to produce an illumination of the indicia which are in proximity to the starting position indicator simultaneously with delivery of the second defined signal.

9. Means as defined in claim 8, together with means to produce a photographic record of the indicia on the rotary mass which indicia are proximate to the starting position of the rotary mass, including a photographic record of the stationary starting position indicator in relation to such indicia, at the instant of delivery of said second defined signal.

10. Means as defined in claim 8, together with means to make inoperative the means which produces an illumination of the indicia which are in proximity to the starting position indicator, when a selected indicia on the rotary mass is located at an angular position from the starting position produced by angular advance of the rotary mass under said spring urge, produced by rotation of the mass during a time interval greater than the time interval to traverse the length of the test zone at a pre-determined vehicle speed.

11. Means as defined in claim 10, wherein said selected indicia designates a vehicle speed.

12. Means as defined in claim 11, wherein said designated vehicle speed is a lawfully designated speed.

13. Means as defined in claim 1, together with means to make inoperative the connections between the second defined signal producing means and the means which produces an indication of the moved position of the indicia on the mass, when the time interval between delivery of the first defined signal and delivery of the second defined signal is greater than the time to traverse the test zone at a predetermined speed.

14. Means as defined in claim 13, wherein said predetermined speed is a lawfully determined speed.

15. Means to determine and give an indication of the speed of a travelling vehicle in comparison with a predetermined speed, comprising in combination means to deliver a first defined signal when the vehicle passes the beginning of a speed test zone of predetermined length, means to deliver a second defined signal when the vehicle passes the end of said speed test zone, a rotary mass, means to journal said mass for rotation about its axis, spring means connected with the mass and constituted to urge rotation of the mass in a time count direction during unwinding of the spring, means to lock the mass against rotation at a starting position and against urge of the spring, means to unlock the locking means, operative connections between the first defined signal delivering means and the unlocking means, constituted to unlock the mass when the first defined signal is delivered, for release of the mass for rotation under unwinding urge of the spring, a stationary starting position indicator in proximity to the mass, indicia on the mass movable with the mass in comparison with said stationary starting point indicator, the mass and the journal means therefor being constituted for rotation of the mass in said time count direction through a predetermined angular amount, together with means to drive the mass in reverse direction of rotation from the terminus of said predetermined angular amount, to the starting position, with rewind of the spring during such reverse direction drive, including means to start such reverse direction drive when the mass reaches the terminus of such rotation in the time count direction, and means to discontinue such reverse direction drive when the mass reaches the starting position.

16. Means as defined in claim 15, wherein the means to drive the mass in said reverse direction includes a drive motor, and clutch means between such drive motor and the rotary mass, together with means to engage the clutch means when the mass reaches the terminus of such rotation in the time count direction, and means to disengage the clutch means when the mass reaches the starting position.

17. Means to determine and give an indication of the speed of a travelling vehicle in comparison with a predetermined speed, comprising in combination means to deliver a first defined signal when the vehicle passes the beginning of a speed test zone of predetermined length, means to deliver a second defined signal when the vehicle passes the end of said speed test zone, a movable mass, means to cause said mass to move through a path of travel of predetermined form, spring means connected to the mass and constituted to urge movement of the mass along said path in a time counting direction during unwinding of the spring, means to lock the mass against such movement at a starting position and against the urge of the spring, means to unlock the locking means, operative connections between the first defined signal delivering means and the unlocking means, constituted to unlock the mass when the first defined signal is delivered, for release of the mass for travel along said path under unwinding urge of the spring, a starting position indicator in proximity to the mass, indicia on the mass movable with the mass in reference comparison with said stationary starting point indicator, means to produce an indication of the moved position of the indicia in comparison with the starting position indicator, and operative connections between the second defined signal producing means and the means which produces an indication of the moved position of the indicia on the mass, constituted to activate the indication producing means when the second defined signal is delivered.

18. Means as defined in claim 17, together with means to drive the mass in reverse direction along the path from the terminus of said time count direction movement along said path, to the starting position, with rewind of the spring during reverse direction drive, including means to start such reverse direction drive when the mass reaches the terminus of movement in the time count direction, and means to discontinue such reverse direction drive when the mass reaches the starting position.

References Cited in the file of this patent

UNITED STATES PATENTS

| | | |
|---|---|---|
| 2,091,357 | Goldsmith | Aug. 31, 1937 |
| 2,361,826 | Dowden | Oct. 31, 1944 |
| 2,619,402 | McCutcheon | Nov. 25, 1952 |
| 2,635,692 | Scheske | Apr. 21, 1953 |
| 2,683,071 | Pearle | July 6, 1954 |
| 2,927,836 | Shore | Mar. 8, 1960 |
| 2,927,837 | Martin | Mar. 8, 1960 |
| 3,060,434 | Biedermann | Oct. 23, 1962 |